(12) United States Patent
Yoshikawa

(10) Patent No.: US 6,665,001 B1
(45) Date of Patent: Dec. 16, 2003

(54) MULTIPLEX AND DEMULTIPLEX CONTROLLING APPARATUS, MULTIPLEX AND DEMULTIPLEX CONTROLLING SYSTEM, AND METHOD THEREOF

(75) Inventor: Masato Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/464,487

(22) Filed: Dec. 15, 1999

(30) Foreign Application Priority Data

Dec. 21, 1998 (JP) .......................................... 10-363575

(51) Int. Cl.$^7$ ................................................. H04N 7/14
(52) U.S. Cl. .................................. 348/14.12; 348/14.13
(58) Field of Search ........................... 348/14.01–14.09, 348/14.1, 14.11–14.13; 370/260, 261; 709/204; 345/753; H04N 7/14

(56) References Cited

U.S. PATENT DOCUMENTS 6,321,252 B1 * 11/2001 Bhola et al. ................. 709/204

FOREIGN PATENT DOCUMENTS

| JP | 5-22719 | 1/1993 | ............ H04N/7/14 |
| JP | 410066069 A | * 3/1998 | ............ H04N/7/24 |

* cited by examiner

Primary Examiner—Melur Ramakrishnaiah
(74) Attorney, Agent, or Firm—Michael Best & Friedrich LLC

(57) ABSTRACT

Multiplexed image data and control data are demultiplexed from each other, and time information is added thereto, respectively, and the image data and control data are stored in temporary storage means, and the corresponding image data and control data are read out from the temporary storage means in accordance with synchronous timing corresponding to the time information which is added thereto, and a control processing is conducted in accordance with the control data while the image data is reproduced, and at the same time, the synchronous timing is corrected in response to a difference between the time information which is added to the image data and the time information which is added to the control data, and accordingly, it is possible to control an apparatus not only by means of synchronization with and a display of video voice but also synchronously with the video voice, and furthermore, it is possible to avoid a delay of synchronization between the video voice and a control device since the synchronous timing is corrected in response to a difference between processing periods of time.

14 Claims, 7 Drawing Sheets

MULTIPLEX AND DEMULTIPLEX CONTROLLING APPARATUS, MULTIPLEX AND DEMULTIPLEX CONTROLLING SYSTEM, AND METHOD THEREOF

BACKGROUND OF THE INVENTION

The present Invention relates to a technology for demultiplexing a multiplexed data in which an image data and a control data are multiplexed, into an image data and a control data, and controlling an apparatus in response to the demultiplexed image data while being synchronized with reproduction of the demultiplexed image data.

Conventionally, as a technology for demultiplexing an image data and a control data from each other, as disclosed in JP-A-22719/1993 for example, a technology is known, in which image, voice and control data are multiplexed, and the data are transferred, multiplexedly demultiplexed, and utilized.

FIG. 7 is a block diagram for explaining such a prior art. In this figure, a multimedia multiplexing and demultiplexing/inter-terminal controlling section 71 conducts multiplexing and demultiplexing of an image data and a control data in a communication frame which was transmitted and received by a network interface communication controlling section 72.

An image codec 73 conducts encoding and decoding of an image data. A video inputting and outputting interface 74 connects an external camera 75 with the image codec 73. A control section 76 controls operation of an external camera 78 through a camera external instrument multiconnector 77 based on a control data received from the multimedia multiplexing and demultlplexing/inter-terminal controlling section 71.

According to such an arrangement, if the camera 75 is connected with a monitor through the video inputting and outputting interface 74, it becomes to be possible to structure a television conference system capable of controlling operation of the camera from an outside.

By the way, in such a prior art, timing of image reproduction cannot be synchronized with processing timing of a control data. Accordingly, there were a task in which an image display by means of an image data, a voice data and a control data and a control device operate independently, and a series of these operations cannot be synchronized with each other, and a task in which, since respective processing sections are independent of each other, when image reproduction and device control are actually conducted, a time lag occurs due to a difference between processing periods of time, and it is not possible to synchronously control the operation of the camera In accordance with a certain image.

SUMMARY OF THE INVENTION

Therefore, the objective of the present invention is to solve the above-described tasks.

Also, the objective of the present invention is to provide a technology of multiplex and demultiplex control, which is capable of controlling an apparatus not only synchronously with reproduction of video voice but also synchronously with the video voice to be reproduced.

The above-described objective of the present invention is accomplished by a multiplex and demultiplex controlling apparatus having:

multiplex and demultiplex means for demultiplexing multiplexed image data and control data from each other, adding time information to the above-described demultiplexed image data and control data, respectively, and outputting them;

storage means for temporarily storing an output from the above-described multiplex and demultiplex means;

timing controlling means for generating read-out indication of corresponding image data and control data in accordance with synchronous timing corresponding to the above-described time information which is added to the above-described image data and control data stored in the above-described storage means;

image reproducing means for reproducing an image data read out from the above-described storage means in response to the above-described read-out indication of the above-described timing controlling means, and conducting a feedback output of time information to be added to the above-described reproduced image data;

control processing means for conducting a control processing in accordance with a control data which is read out from the above-described storage means in response to the above-described read-out indication of the above-described timing controlling means, and conducting a feedback output of time information to be added to the above-described control data; and timing correcting means for correcting the above-described synchronous timing of the above-described timing controlling means in response to a difference between time information fed back from the above-described image reproducing means and control processing-means, respectively.

In addition, as a preferable embodiment, the above-described image reproducing means is characterized in that it includes means for reproducing an image data consisted of a video data and a voice data, and synchronously reproducing the above-described video data and voice data, and also, the above-described multiplex and demultiplex means is characterized in that it discriminates between an image data and a control data from a packet to be transmitted and demultiplex an image data stream and a control data stream from each other, and adds time information to the above-described demultiplexed image data stream and control data stream, respectively.

Furthermore, in the above-described multiplex and demultiplex controlling apparatus, plural kinds of image data or control data to be multiplexed are provided, and the above-described plural kinds demultiplex multiplexed image data or control data from each other, and a control processing synchronous with plural kinds of image reproductions or a plurality of control processings synchronous with a single image reproduction can be conducted in accordance with the above-described demultiplexed plural kinds of image data or control data.

The above-described objective of the present invention is accomplished by a multiplex and demultiplex controlling system having:

means for adding time information to an image data;

means for adding time information to a control data;

multiplexing means for multiplexing the above-described image data to which the above-described time information is added and the above-described control data to which the above-described time information is added;

demultiplex means for demultiplexing the above-described multiplexed image:data and control data from each other;

storage means for temporarily storing an output from the above-described demultiplex means;

timing controlling means for generating a timing signal for indicating read-out of the above-described stored image data and control data in accordance with synchronous timing corresponding to the above-described time information which is added to the above-described image data and control data stored in the above-described storage means;

image reproducing means for reproducing an image data read out from the above-described storage means in response to the above-described timing signal, and conducting a feedback output of time information which is added to the above-described reproduced image data;

control processing means for conducting a control processing in accordance with a control data which is read out from the above-described storage means in response to the above-described timing signal, and conducting a feedback output of time information which is added to the above-described control data; and timing correcting means for correcting the above-described synchronous timing of the above-described timing controlling means in response to a difference between time information fed back from the above-described image reproducing means and the above-described control processing means, respectively.

Also, the above-described objective of the present invention is accomplished by a multiplex and demultiplex controlling method, having steps of:

demultiplexing multiplexed image data and control data from each other, and adding time information to the above-described demultiplexed image data and control data, respectively;

storing the above-described demultiplexed image data and control data to which time information is added;

generating read-out indication of the above-described stored image data and control data in accordance with synchronous timing corresponding to the above-described time information which is added to the above-described stored image data and control data;

reading out the above-described stored image data in response to the above-described read-out indication;

reproducing the above-described image data which is read out, and conducting feedback of time information which is added to the above-described image data;

reading out the above-described stored control data in response to the above-described read-out indication;

conducting a control processing in accordance with the above-described control data which is read out, and conducting feedback of time information which is added to the above-described control data; and correcting timing of the above-described read-out indication in response to a difference between time information of the above-described image data which is fed back and time information of the above-described control data which is fed back.

Also, the above-described objective of the present invention is accomplished by a multiplex and demultiplex controlling method, having steps of:

adding time information to an image data;

adding time information to a control data;

multiplexing the above-described image data to which the above-described time information is added and the above-described control data to which the above-described time information is added;

transmitting the above-described multiplexed data;

receiving the above-described multiplexed image data and control data, and demultiplexing the above-described multiplexed image data and control data from each other;

storing the above-described demultiplexed image data and control data;

generating read-out indication of the above-described stored image data and control data in accordance with synchronous timing corresponding to the above-described time information which is added to the above-described stored image data and control data;

reading out the above-described stored image data in response to the above-described read-out indication;

reproducing the above-described image data which is read out, and conducting feedback of time information which is added to the above-described image data;

reading out the-above-described stored control data in response to the above-described read-out indication;

conducting a control processing in accordance with the above-described control data which is read out, and conducting feedback of time information which is added to the above-described control data; and correcting timing of the above-described read-out indication in response to a difference between time information of the above-described, image data which is fed back and time information of the above-described control data which is fed back.

In the present invention, since multiplexed image data and control data are demultiplexed from each other, and time information is added to the demultiplexed image data and control data, respectively, and the image data and control data are stored in temporary storage means, and the corresponding image data and control data are read out from the temporary storage means in accordance with synchronous timing corresponding to the time information which is added to the image data and control data, and a control processing is conducted in accordance with the control data while the image data is reproduced, and at the same time, the synchronous timing is corrected in response to a difference between the time information which is added to the image data and the time information which Is added to the control data, it becomes to be possible to control an apparatus not only synchronously with reproduction of video voice but also synchronously with the video voice to be reproduced.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Below, one embodiment in accordance with the present invention will be explained referring to drawings.

A multiplex and demultiplex controlling apparatus in accordance with the present invention has a function capable of demultiplexing a multiplexed digital data into an image data and a control data, and conducting operations corresponding to the respective data synchronously with each other. By utilizing this function, it is possible to demultiplex a data output from a device for transmitting a multiplexed data, such as a digital VTR and a satellite tuner, into an image data and a control data, and to control the image data during its reproduction in accordance with a certain image and synchronously with other instruments.

Whole Arrangement

Figure 1:
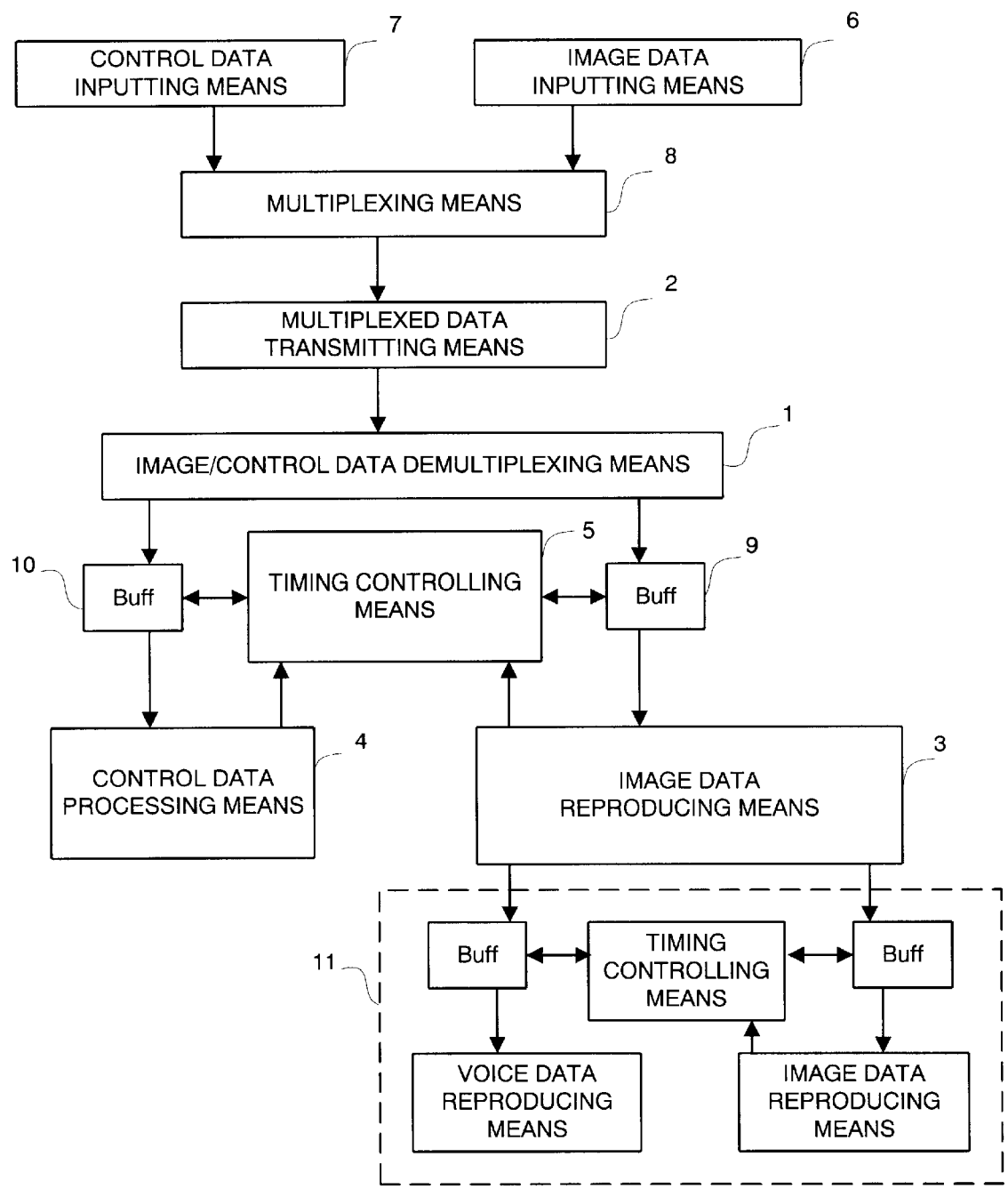
FIG. 1 is a block diagram showing an arrangement in one embodiment of the present invention.

Referring to FIG. 1, an arrangement of the multiplex and demultiplex controlling apparatus of the present invention will be explained. In FIG. 1, multiplexing means 8 multiplexes data which are input through an image data inputting means 6 and a control data inputting means 7, respectively. The multiplexed data are supplied to the multiplex and demultiplex controlling apparatus through a multiplexed data transmitting means 2.

The multiplex and demultiplex controlling apparatus is comprised of an image/control data demultiplexing means 1, buffers 9 and 10, timing controlling means 5, control data processing means 4, image data reproducing means 3, and a decoder 11.

The image/control data demultiplexing means 1 demultiplex a multiplexed data into an image data and a control data, and adds time information to the demultiplexed image data and control data. And, the image/control data demultiplexing means 1 writes down the control data in the buffer 9 and the image data in the buffer 10, respectively. In addition, here, the image data may include both a video data and voice or may include only a video data (same in hereinafter).

Furthermore, the control data and the image data are sent to the timing controlling means 5 through the buffers 9 and 10, and time information which is added in the timing controlling means 5 is confirmed. Thereafter, the timing controlling means 5 conducts processing for allowing an output of the image data in the buffer 9 (generates a timing signal).

The image data is transferred to the image data reproducing means 3, and is transferred to the decoder 11 consisted of a voice data reproducing means and a video data reproducing means. On the other hand, an output of the control data from the buffer 10 is allowed when the time information of the image data coincides with the time information of the control data. The control data is transferred to the control data processing means 4, and a processing is applied thereto. The processing means that a device to be processed by means of the control data is operated.

And, the image data reproducing means 3 and the control data processing means 4 feed back the added time information to the timing controlling means 5, and accordingly, the timing controlling means 5 detects a difference between a processing period of time by the image data reproducing means 3 and a processing period of time by the control data processing means 4. Thereafter, the timing controlling means 5 controls data outputs from the buffers 9 and 10 at appropriate timing; and synchronizes a data processing. The synchronization of the video and voice is realized, and the video and voice are reproduced in the decoder 11 that is based on a known system. The synchronization is consisted of two stages of voice and video, and their reproduced data and control data.

Data Arrangement

Figure 2:
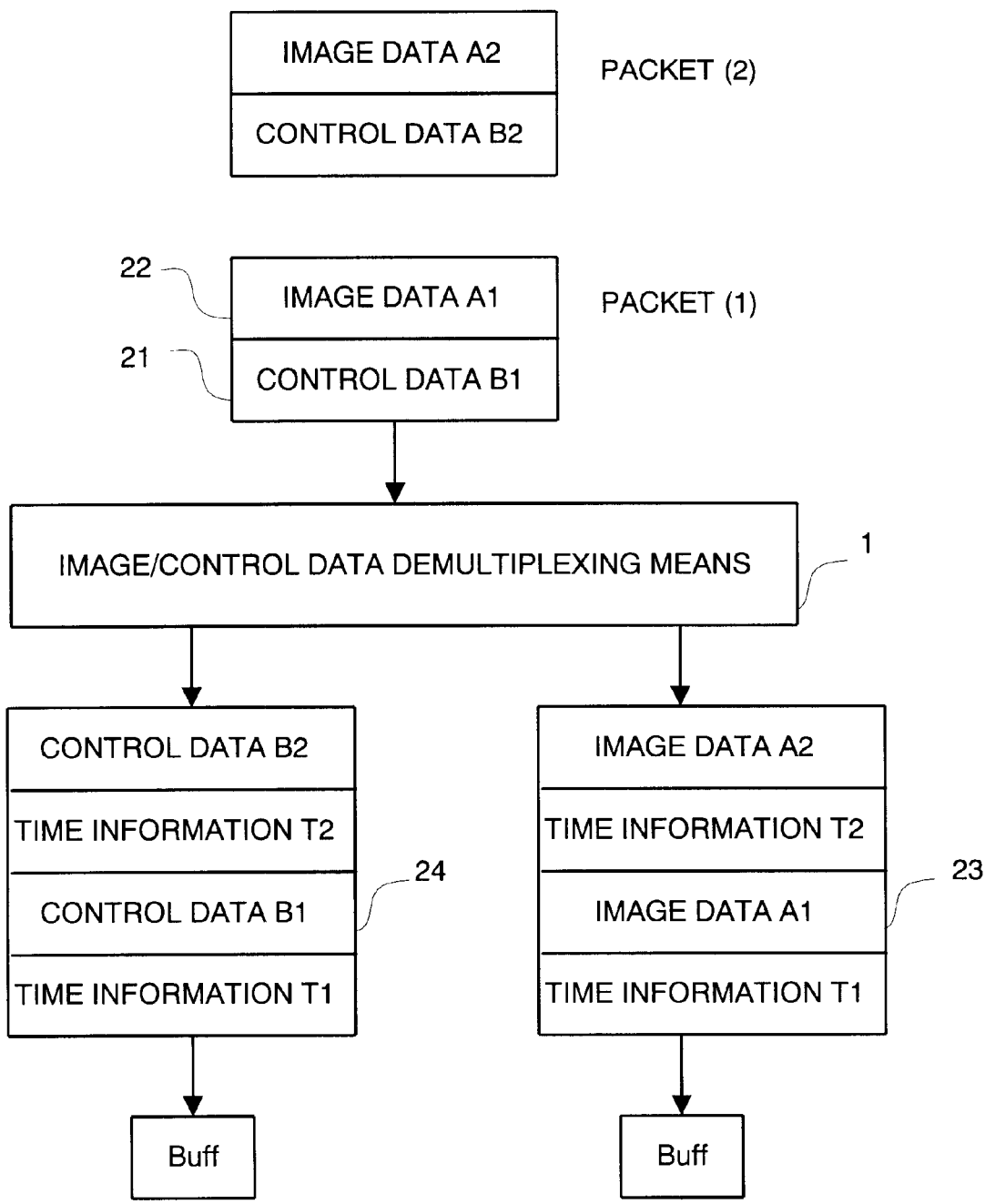
FIG. 2 is a view for explaining a data arrangement.

Next, referring to FIG. 2, an arrangement of an input data and an output data in the image/control data demultiplexing means 1 will be explained.

A packet (1) of a multiplexed data including an image data 21 and a control data 22 is transferred to the image/control data demultiplexing means 1.

The image/control data demultiplexing means 1 discriminates between the image data 21 and the control data 22 of the received packet (1), and demultiplex them into an image data stream and a control data stream. After time information is added to the demultiplexed data streams, they are transferred to the buffers 9 and 10, respectively. The image data stream 23 to which the time information is added is maintained in the buffer 9, and the control data stream 24 is maintained in the buffer 10. And, after the maintenance in the buffers, the image and control data streams are transferred to the timing controlling means 5 if necessary.

Relation Between Time Information

Figure 3:
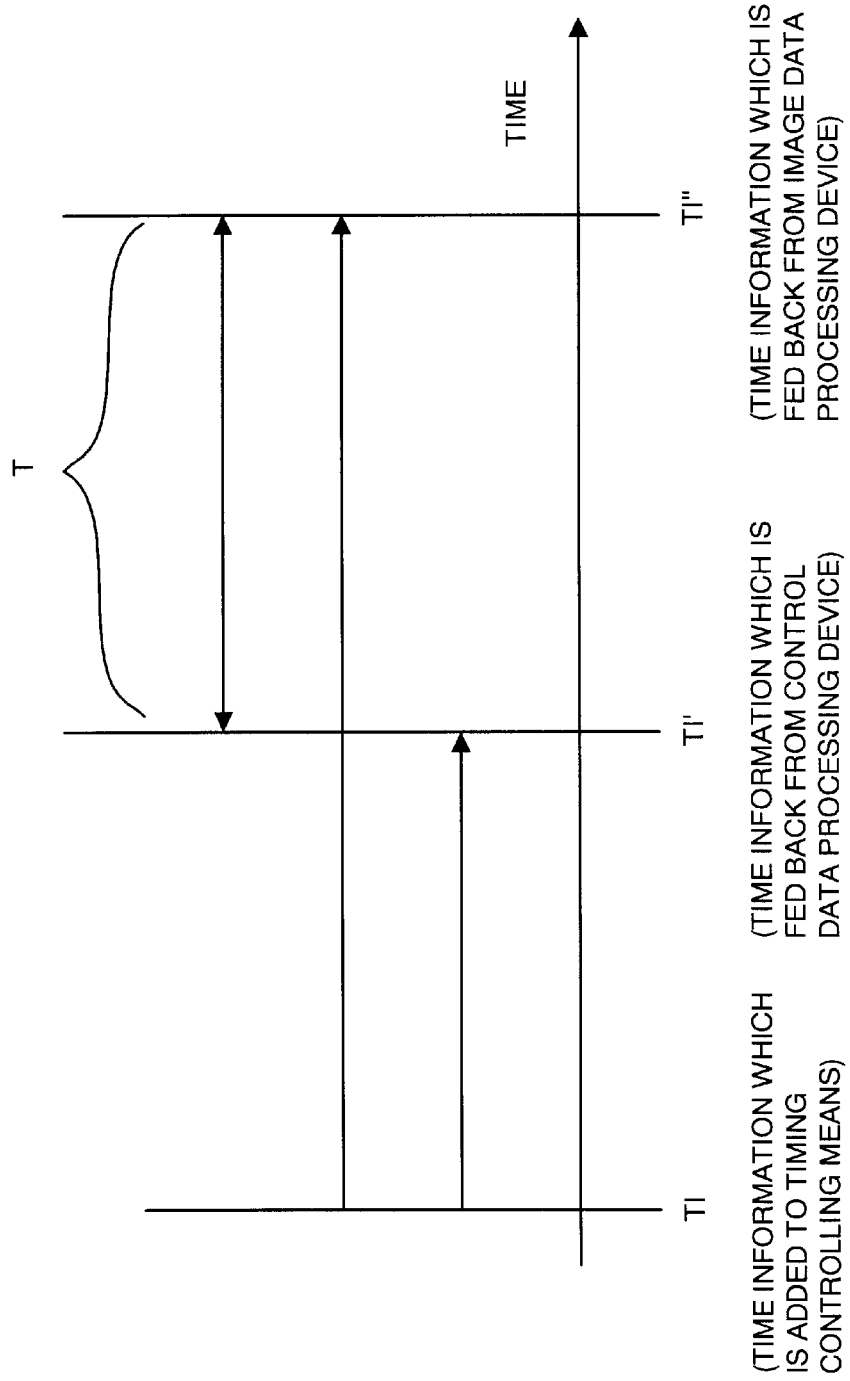
FIG. 3 is a view for explaining a relation between time information.

Next, referring to FIG. 3, a relation between the time information which is added by the timing controlling means 5 and the time information which is fed back from the image data processing means 3 and the control data processing means 4 will be explained.

When the data are transferred to each processing function, a count of time begins. If the control data is processed, the timing information T1 which is added thereto is fed back to the timing controlling means 5. When the timing controlling means 5 confirms that the time information T1 has returned, it detects the time which has been counted. The time is assumed to be T1'.

Following this, the image data is processed, and the timing information T1 which is added thereto is fed back. to the timing controlling means 5. Time which has been counted until the data is output and fed back is assumed to be T1". A difference between each time when the respective time information arrives is assumed to be T, and by utilizing this time difference T, timing of data outputs from the buffers 9 and 10 is adjusted. For example, in this case, by delaying an output from the buffer 10 of the control data by the time difference T, an image and the control device are synchronized.

Operation

Next, referring to FIG. 1 and FIG. 2, operation of the multiplex and demultiplex controlling apparatus having the above-described arrangement will be explained.

First, when the multiplexing means 8 multiplexes data input from the image data inputting means 6 and the control data inputting means 7, the multiplexed data are transferred to the multiplexed data transmitting means 2. A route of this transfer is a medium such as a broadcasting system, a communication system and a package system. As a data format by which the multiplexed data are output from this multiplexed data transmitting means 2, for example, a transport stream that Is a stream data of a well-known MPEG2 is preferable. The data includes a control data and an image data. The output data are received by the image/control data demultiplexing means 1.

The image/control data demultiplexing means 1 discriminates between an image data and a control data, based on information of the received data, or information included in a header for example, and demultiplex the respective data into other stream data. Time information is added to the demultiplexed-data, respectively, and the data are transferred to the buffer 9 for the image data and the buffer 10 for the control data, respectively.

The image data stream 23 is sent to the timing controlling means 5, and the time information is confirmed. When the time information is confirmed, an output from the buffer 9 is allowed for the timing controlling means 5, and the time information is transferred to the image data reproducing means 3. A timer inside the timing controlling means 5 operates in accordance with the time information.

Similarly, with regard to the control data stream 24, the timer inside the timing controlling means 5 and the time information are referred to.

If the time information held in the timing controlling means 5 coincides with the time information that the control data stream 24 has, immediately an output from the buffer 10 is allowed for the control data stream 24, and the time information is transferred to the control data processing means 4.

As soon as the respective data are processed, the image data reproducing means 3 and the control data processing means 4 feed back the added time information to the timing controlling means 5.

By means of the time information fed back from the image data reproducing means 3 and the control data processing means 4, the timing controlling means 5 detects a difference between time when a processing of the image data is completed and time when a processing of the control data is completed.

Thereafter, the timing controlling means 5 adjusts output timing of the image data and the control data from the buffers 9 and 10 by means of a difference therebetween, and synchronizes the reproduction and the control processing.

In this manner, according to the present invention, since the time information is added to the demultiplexed image data and control data, and based on this, the timing controlling means 5 synchronizes timing of the image reproduction and timing of the control processing, it is possible to operate a device which is connected not only by means of synchronization and a display of video voice but also synchronously with its image. Also, since, after the image data and the control data are processed, processing completion time is fed back and time when the data are transferred is independently corrected, respectively, it is possible to eliminate a delay between the image and the control device, and accordingly, it is possible to correct a delay between timing of the image display and timing of the device control, and to provide feeling like attendance more in the image display.

Other Embodiment

Figure 4:
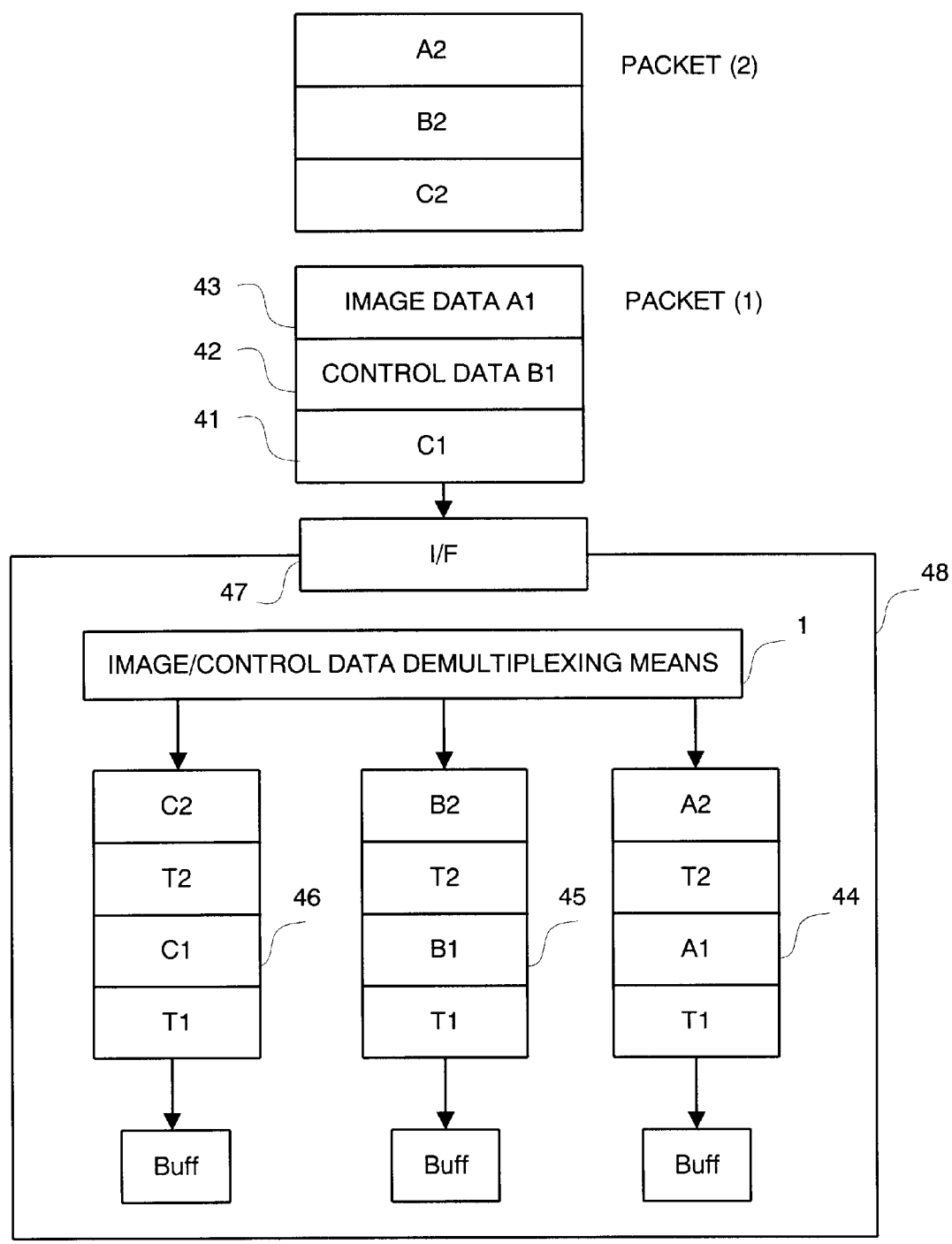
FIG. 4 is a view for explaining other embodiment.

Next, referring to FIG. 4, an embodiment in which the image/control data demultiplexing means 1 and the buffers 9 and 10 are embodied by a personal computer 48 will be explained.

In the case of this embodiment, a multiplexed data is received by way of an interface 47, and is demultiplexed by the image/control data demultiplexing means 1. By multiplexing the data by means of a plurality of data 41, 42 and 43, it is possible to provide a plurality of control data or a plurality of image data, such as an image data 44 and control data 45 and 46 or image data 44 and 45 and a control data 46, and accordingly, it becomes to be possible to concurrently control a plurality of connection devices or to control the devices while a plurality of Image planes are displayed.

Figure 5:
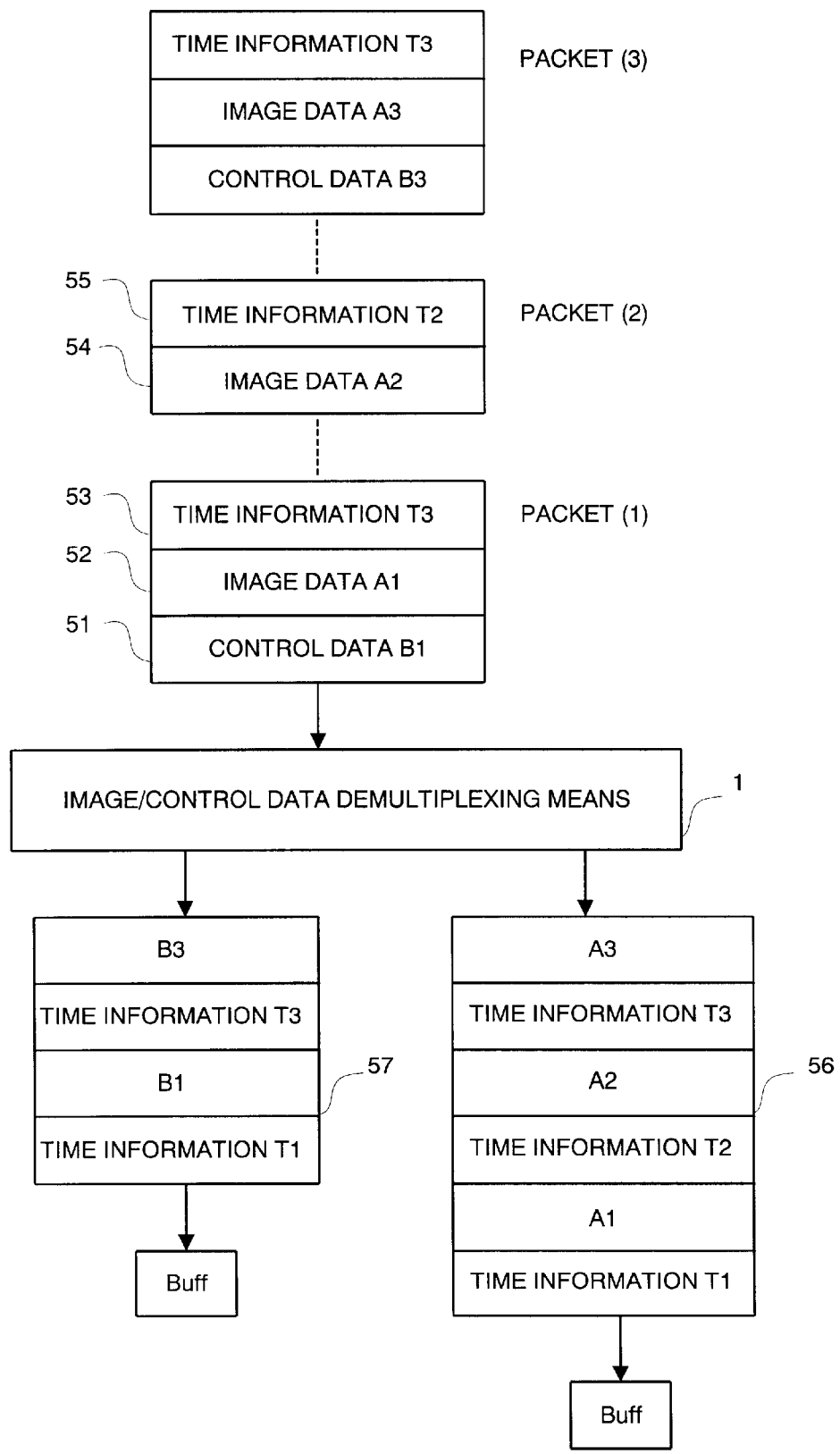
FIG. 5 is a view for explaining other embodiment.

Next, FIG. 5 is a view showing an embodiment in which time Information is added in advance to a packet to be transmitted through the multiplexed data transmitting means 2. In the case of the embodiment shown in this figure, with regard to a data demultiplexed by the image/control data demultiplexing means 1, in case that a control data (time information) is not included in a certain packet like a packet (2), the packet is skipped, and a control data stream is created. And, the timing controlling means 5 utilizes other time information, and accordingly, it is possible to process a control device and an image synchronously with each other.

Figure 6:
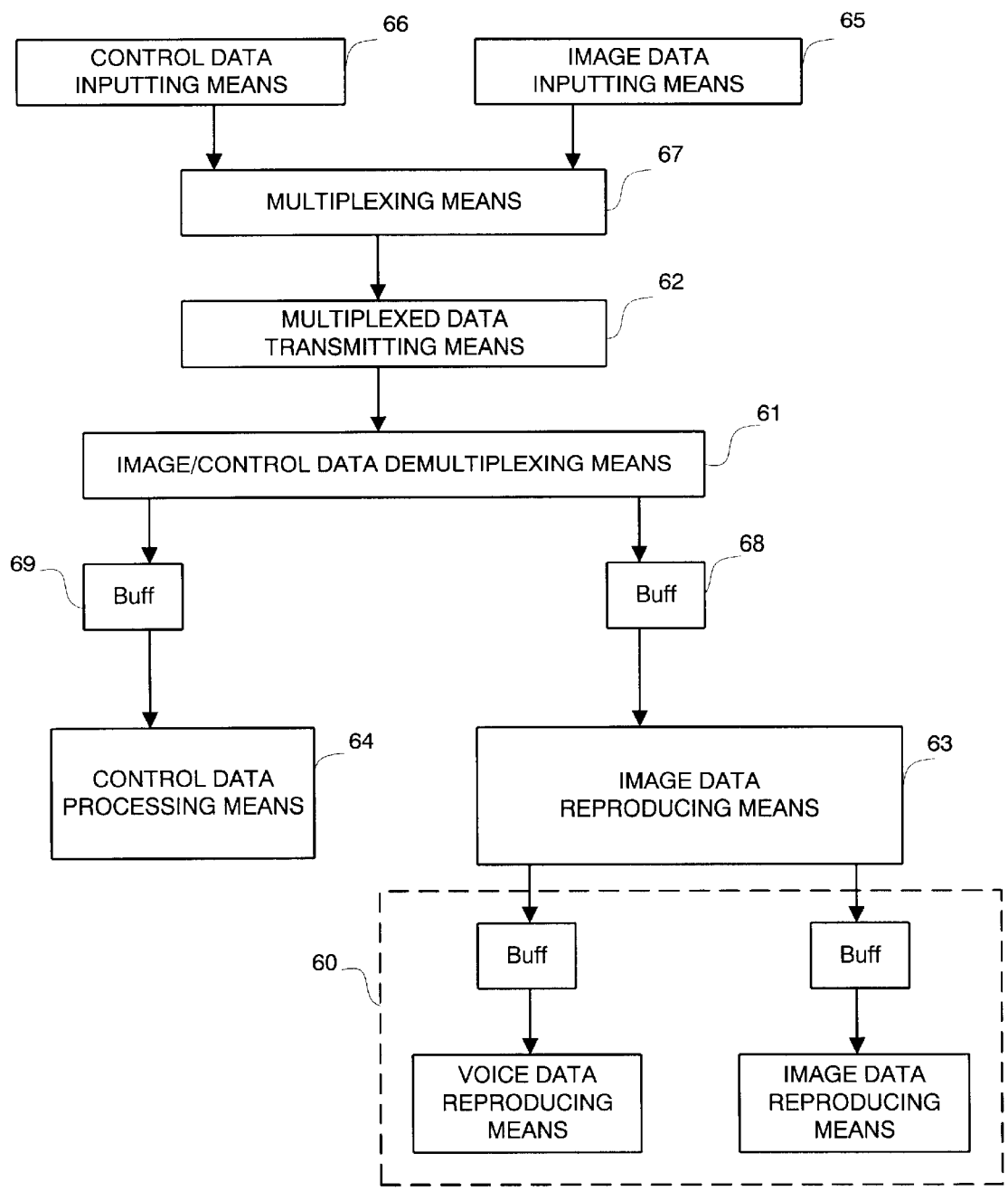
FIG. 6 is a view for explaining other embodiment.
Figure 7:
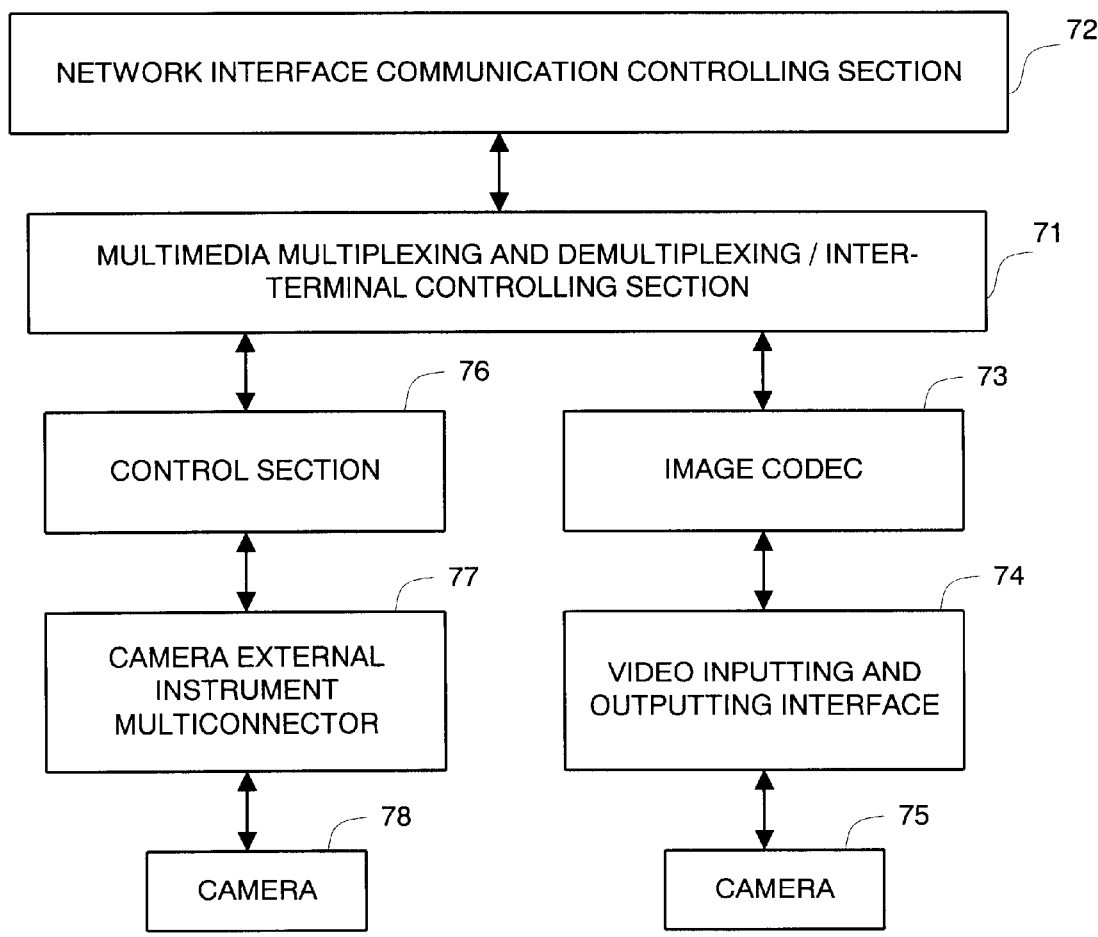
FIG. 7 is a view for explaining a prior art.

FIG. 6 is a view showing further other embodiment. In this embodiment, data Input by a control data inputting means 66 and an image data Inputting means 65 are multiplexed by a multiplexing means 67. And, the multiplexed data are sent to an image/control data demultiplexing means 61 through a multiplexed data transmitting means 62 by means of broadcasting, communication or package. The image/control data demultiplexing means 61 demultiplex an image data and a control data from each other, and writes down the respective data in buffers 68 and 69. By an image data. reproducing means 63, the data written therein are transferred to a voice data reproducing/video data reproducing means 60 and is processed at any time, and is processed by a control data processing means 64.

In accordance with the present invention, multiplexed image data and control data are demultiplexed from each other, and time information is added thereto, respectively, and the image data and control data are stored in storage means, and the corresponding image data and control data are read out from the temporary storage means In accordance with synchronous timing corresponding to the time information which is added thereto, and a control processing is conducted in accordance with the control data while the image data is reproduced, and at the same time, the synchronous timing is corrected in response to a difference between the time information which is added to the image data and the time information which is added to the control data, and accordingly, it is possible to operate a device which is connected not only by means of synchronization and a display of video voice but also synchronously with its image.

Also, since, after the image data and the control data are processed, the synchronous timing is corrected in response to a difference between periods of processing completion time, it is possible to eliminate a delay between the image and the control device, and accordingly, it is also possible to correct a delay between timing of the image display and timing of the device control, and to provide feeling like attendance more in the image display.

The entire disclosure of Japanese Patent Application No. 10-363575 filed on Dec. 21, 1998 including specification, claims, drawing and summary are incorporated herein by reference in its entirety.

What is claimed is:

1. A multiplex and demultiplex controlling apparatus comprising:
   multiplex and demultiplex means for demultiplexing multiplexed image data and control data from each other, adding time information to said demultiplexed image data and control data, respectively, and outputting them;
   storage means for temporarily storing an output from said multiplex and demultiplex means;
   timing controlling means for generating read-out indication of corresponding image data and control data in accordance with synchronous timing corresponding to said time information which is added to said image data and control data stored in said storage means;

image reproducing means for reproducing an image data read out from said storage means in response to said read-out indication of said timing controlling means, and conducting a feedback output of time information to be added to said reproduced image data;

control processing means for conducting a control processing in accordance with a control data which is read out from said storage means in response to said read-out indication of said timing controlling means, and conducting a feedback output of time information to be added to said control data; and timing correcting means for correcting said synchronous timing of said timing controlling means in response to a difference between time information fed back from said image reproducing means and control processing means, respectively.

2. A multiplex and demultiplex controlling apparatus according to claim 1, wherein said image reproducing means includes means for reproducing an image data consisted of a video data and a voice data, and synchronously reproducing said video data and voice data.

3. A multiplex and demultiplex controlling apparatus according to claim 1, wherein said multiplex and demultiplex means has means for discriminating between an image data and a control data from a packet to be transmitted and demultiplexing an image data stream and a control data stream from each other, and for adding time information to said demultiplexed image data stream and control data stream, respectively.

4. A multiplex and demultiplex controlling apparatus according to claim 1, wherein plural kinds of image data or control data to be multiplexed are provided, and said plural kinds demultiplex multiplexed image data or control data from each other, and a control processing synchronous with plural kinds of image reproductions or a plurality of control processings synchronous with a single image reproduction are conducted in accordance with said demultiplexed plural kinds of image data or control data.

5. A multiplex and demultiplex controlling apparatus comprising:

multiplex and demultiplex means for discriminating between an image data and a control data from a packet which has been transmitted, based on a head of said packet, and demultiplexing an image data stream and a control data stream from each other, and for adding time information to said demultiplexed image data stream and control data stream, respectively;

storage means for temporarily storing an output from said multiplex and demultiplex means;

timing controlling means for generating a timing signal for indicating read-out of said stored image data and control data in accordance with synchronous timing corresponding to said time information which is added to said image data and control data stored in said storage means;

image reproducing means for reproducing an image data read out from said storage means in response to said timing signal, and conducting a feedback output of time information which is added to said reproduced image data;

control processing means for conducting a control processing in accordance with a control data which is read out from said storage means in response to said timing signal, and conducting a feedback output of time information which is added to said control data; and timing correcting means for correcting said synchronous timing of said timing controlling means in response to a difference between time information fed back from said image reproducing means and said control processing means, respectively.

6. A multiplex and demultiplex controlling apparatus according to claim 5, wherein said image reproducing means includes means for reproducing an image data consisted of a video data and a voice data, and synchronously reproducing said video data and voice data.

7. A multiplex and demultiplex controlling apparatus according to claim 5, wherein plural kinds of image data or control data to be multiplexed are provided, and said plural kinds demultiplex multiplexed image data or control data from each other, and a control processing synchronous with plural kinds of image reproductions or a plurality of control processings synchronous with a single image reproduction are conducted in accordance with said demultiplexed plural kinds of image data or control data.

8. A multiplex and demultiplex controlling system comprising:

means for adding time information to an image data;

means for adding time information to a control data;

multiplexing means for multiplexing said image data to which said time information is added and said control data to which said time information is added;

demultiplex means for demultiplexing said multiplexed image data and control data from each other;

storage means for temporarily storing an output from said demultiplex means;

timing controlling means for generating-a timing signal for indicating read-out of said stored image data and control data in accordance with synchronous timing corresponding to said time information which is added to said image data and control data stored in said storage means;

image reproducing means for reproducing an image data read out from said, storage means in response to said timing signal, and conducting a feedback output of time information which is added to said reproduced image data;

control processing means for conducting a control processing in accordance with a control data which is read out from said storage means in response to said timing signal, and conducting a feedback output of time information which is added to said control data; and timing correcting means for correcting said synchronous timing of said timing controlling means in response to a difference between time information fed back from said image reproducing means and said control processing means, respectively.

9. A multiplex and demultiplex controlling system according to claim 8, wherein said image reproducing means includes means for reproducing an image data consisted of a video data and a voice data, and synchronously reproducing said video data and voice data.

10. A multiplex and demultiplex controlling system according to claim 8, wherein plural kinds of image data or control data to be multiplexed are provided, and said plural kinds demultiplex multiplexed image data or control data from each other, and a control processing synchronous with plural kinds of image reproductions or a plurality of control processings synchronous with a single image reproduction are conducted in accordance with said demultiplexed plural kinds of image data or control data.

11. A multiplex and demultiplex controlling method, comprising steps of:

demultiplexing multiplexed image data and control data from each other, and adding time information to said demultiplexed image data and control data, respectively;

storing said demultiplexed image data and control data to which time information is added;

generating read-out indication of said stored image data and control data in accordance with synchronous timing corresponding to said time information which is added to said stored image data and control data;

reading out said stored image data in response to said read-out indication;

reproducing said image data which is read out, and conducting feedback of time information which is added to said image data;

reading out said stored control data in response to said read-out indication;

conducting a control processing in accordance. with said control data which is read out, and conducting feedback of time information which is added to said. control data; and correcting timing of said read-out indication in response to a difference between time information of said image data which is fed back and time information of said control data which is fed back.

12. A multiplex and demultiplex controlling method according to claim 11, wherein plural kinds of image data or control data to be multiplexed are provided, and said plural kinds demultiplex multiplexed image data or control data from each other, and a control processing synchronous with plural kinds of image reproductions or a plurality of control processings synchronous with a single image reproduction are conducted in accordance with said demultiplexed plural kinds of image-data or control data.

13. A multiplex and demultiplex controlling method, comprising steps of:

adding time information to an image data;

adding time information to a control data;

multiplexing said image data to which said time information is added and said control data to which said time information is added;

transmitting said multiplexed data;

receiving said multiplexed image data and control data, and demultiplexing said multiplexed image data and control data from each other;

storing said demultiplexed image data and control data;

generating read-out indication of said stored image data and control data in accordance with synchronous timing corresponding to said time information which is added to said stored image data and control data;

reading out said stored image data in response to said read-out indication;

reproducing said image data which is read out, and conducting feedback of time information which is added to said image data;

reading out said stored control data in response to said read-out indication;

conducting a control processing in accordance with said control data which is read out, and conducting feedback of time information which is added to said control data; and correcting timing of said read-out indication in response to a difference between time information of said image data which is fed back and time information of said control data which is fed back.

14. A multiplex and demultiplex controlling method according to claim 13, wherein plural kinds of image data or control data to be multiplexed are provided, and said plural kinds demultiplex multiplexed image data or control data from each other, and a control processing synchronous with plural kinds of image reproductions or a plurality of control processings synchronous with a single image reproduction are conducted in accordance with said demultiplexed plural kinds of image data or control data.

* * * * *